United States Patent [19]

Kress

[11] Patent Number: 4,715,406

[45] Date of Patent: Dec. 29, 1987

[54] CONTROL DISC VALVE

[75] Inventor: Hermann Kress, Filderstadt, Fed. Rep. of Germany

[73] Assignee: Hansa Metallwerke AG, Fed. Rep. of Germany

[21] Appl. No.: 878,243

[22] Filed: Jun. 25, 1986

[30] Foreign Application Priority Data

Jul. 5, 1985 [DE] Fed. Rep. of Germany ....... 3524149

[51] Int. Cl.⁴ ..................... F16K 11/078; F16K 31/72
[52] U.S. Cl. ............................ 137/625.17; 137/625.4; 251/48
[58] Field of Search ........... 137/625.17, 625.4, 625.41; 251/48

[56] References Cited

U.S. PATENT DOCUMENTS

| 2,993,706 | 7/1961 | Kilgore | 251/48 |
| 3,433,264 | 3/1969 | Parkison | 137/625.17 |
| 3,543,799 | 12/1970 | Hayman | 137/625.17 X |
| 3,667,503 | 6/1972 | Farrell et al. | 137/624.4 |
| 3,730,226 | 5/1973 | Nelson | 251/48 X |
| 3,736,959 | 6/1973 | Parkison | 137/625.17 |
| 3,965,936 | 6/1976 | Lyon | 137/625.17 |
| 4,402,335 | 9/1983 | Kemmler | 251/48 X |

FOREIGN PATENT DOCUMENTS 2515772  5/1983  France .............................. 137/625.4

OTHER PUBLICATIONS

White, F. M., Fluid Mechanics, N.Y., McGraw-Hill Inc., 1979, pp. 674–675.T

Primary Examiner—Alan Cohan
Assistant Examiner—John Rivell
Attorney, Agent, or Firm—Fred Philpitt

[57] ABSTRACT

In a control disc valve with at least two control discs, the linear movement of one of the control discs, which is involved with a variation in quantity of the medium to be regulated, is prevented by a special brake. For this purpose the movable control disc itself is inserted in a closed chamber so that it divides the latter into two partial chambers. The latter are connected to each other by way of a displacement path. The closed chamber is filled with a fluid medium of suitable viscosity. If the control disc moves in a linear manner for varying the quantity of the medium passing through, it operates within the closed chamber in the manner of a piston and displaces the fluid medium by way of the displacement path from one partial chamber to the other. Active lubrication of the sliding surfaces of the control discs can be associated with this at the same time. (FIG. 1).

15 Claims, 6 Drawing Figures

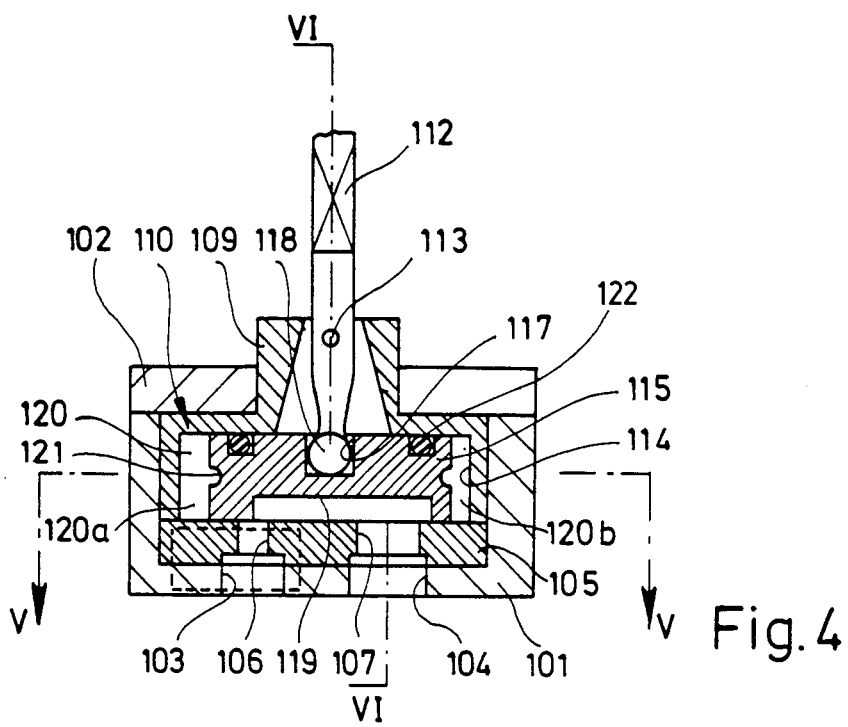
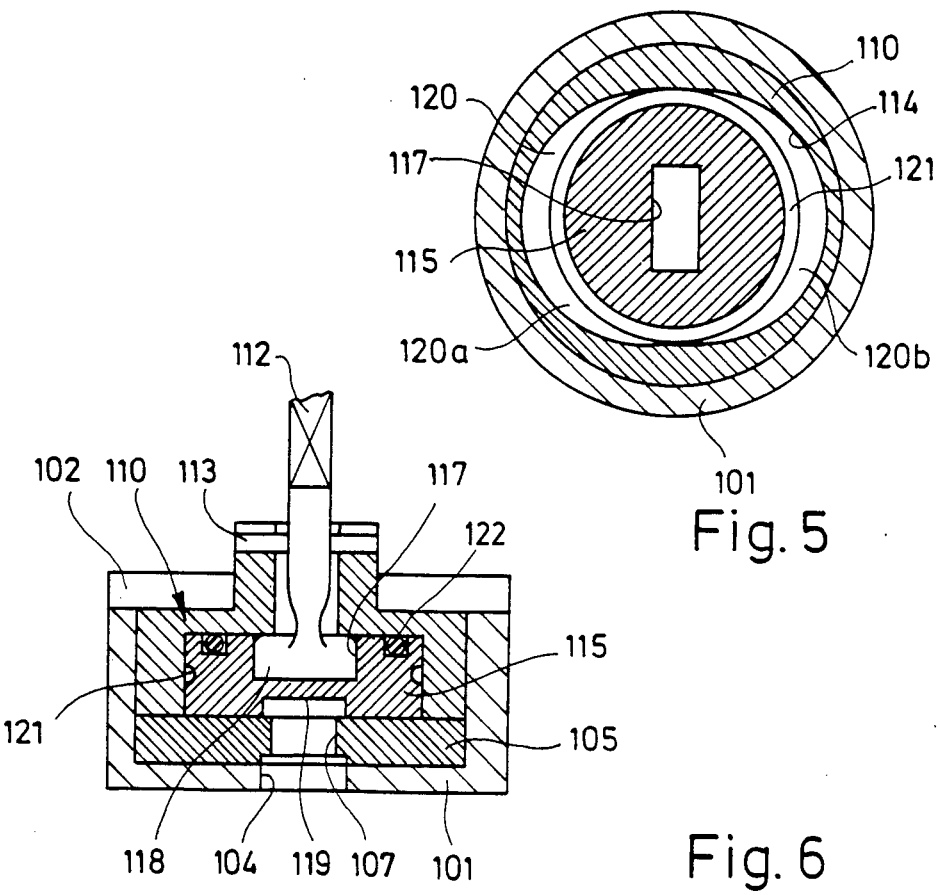
Fig. 4
Fig. 5
Fig. 6

CONTROL DISC VALVE

DESCRIPTION

The invention relates to a control disc valve, in particular for sanitary use, with a housing with at least two control discs, whereof one is able to move in a linear manner with respect to the other for varying the quantity of the medium to be regulated, with a device which opposes a linear movement of the movable control disc.

A control disc valve of this type is known from German OS No. 32 46 350. In this case, strong pressure surges in the piping, which could be caused by sudden closing of the sanitary fitting, are prevented by a movement brake, which is connected to the movable control disc. This movement brake consists of a piston, which is connected to the movable control disc by a piston rod and moves to and fro in a water-filled cylinder. In the case of a linear movement of the movable control disc, water is displaced from the partial chambers of the cylinder by the piston, which leads to the desired braking effect. In the known control disc valve it is a drawback that additional parts are required which not only increase the cost but are also difficult to locate as regards space. The valves already on the market as well as the fitting housing, together with which the valves are to be used, must be constructed afresh from the beginning, in order that the teaching given in German OS 32 46 350 can be followed.

It is the object of the present invention to provide a control disc valve of the aforementioned type, which manages essentially without additional parts for the movement brake.

This object is achieved according to the invention due to the fact that the movable control disc is located in a substantially closed chamber, which it divides in the manner of a piston into two partial chambers, which are connected to each other by way of a displacement path and that the volume of the closed chamber not occupied by the movable control disc is filled with a fluid substance of suitable viscosity.

The basic finding of the invention is thus that the control disc able to move in a linear manner can itself be used as the piston of a movement brake, if the control disc itself is located in a closed chamber similar to a cylinder. Such a closed chamber similar to a cylinder is already essentially available in many known constructions or can be provided without appreciable additional expenditure. A desired braking force can be adjusted within wide limits by suitable coordination of the viscosity of the fluid substance and of the cross section of the displacement path. Considerable or basic alterations to the basic structure of the control disc valve are not necessary, so that generally control disc valves of this type can be made compatible with older manufactured products, thus they can be used as replacement parts.

In general it is provided that the closed chamber is bounded on the underside by the stationary control disc.

On the upper side the closed chamber may be bounded by a third disc, along which the upwardly pointing surface of the movable control disc slides. This relatively expensive technique is normally used when a relatively thin-fluid substance is used for braking the movement and a wear-resistant seal of the closed chamber is desired on the upper side.

The closed chamber can be bounded towards the side by one wall of the housing.

In practice such control disc valves are to be found particularly frequently, in which the movable control disc carries out a combined and linear movement, which is brought about by an adjusting shaft, which is mounted in a part guided in a rotary manner in the housing and engages by a head in an entrainment opening on the upwardly pointing surface of the control disc, in which case the movable control disc is located in a receiving opening open on the underside in the part guided in a rotary manner. In "single lever mixers" of this type, it is provided that the closed chamber includes the volume of the receiving chamber.

Moreover in order to facilitate the sealing of the closed chamber, in this case it may be appropriate if the receiving chamber for the movable control disc is closed laterally in all directions. It is then essentially only necessary to ensure the seal of the closed chamber on the underside, which can take place relatively simply—as mentioned above—by the stationary control disc. Basically it is thus immaterial whether, when introducing the rotary forces into the movable control disc, the part guided in a rotary manner takes over an active role or is only "drawn along" in a passive manner.

The part guided in a rotary manner may thus slide with its downwardly pointing surface on the stationary control disc. Particularly when using relatively viscous substances, this is in many cases sufficient for sealing with respect to the fixed disc.

Alternatively the displacement path, which connects the two partial chambers of the closed chamber to each other, may comprise a gap between the downwardly pointing surface of the part guided in the rotary manner and the stationary control disc.

Finally, in many cases, the embodiment may be provided in which the displacement path comprises a groove in the surface of the movable control disc.

The fluid substance should have a substantially constant viscosity within the range between 10° C. and 80° C., since then no appreciable variation of the braking force occurs in the temperature range in which sanitary fittings are normally used.

In the simplest case the fluid substance is water.

However, it is of particular advantage if the fluid substance has lubricating properties for the control discs. In this case, due to the pumping action, which is associated with the piston-like movement of the control disc in the closed chamber, active lubrication of the sliding surfaces of the two control discs occurs, in which case the lubricating medium is continuously circulated and renewed.

For this purpose the fluid substance may be a silicone oil or grease. Silicone oils or greases of this type with virtually any viscosity are commercially available and physiologically harmless.

The fluid substance may also be a viscous or pasty mass, to which sliding additives are added. The more viscous the fluid substance and the smaller the problems which result from sealing the closed chamber. Natually the cross section of the displacement path, which connects the two partial chambers of the closed chamber to each other, must be correspondingly large when using viscous or pasty masses of this type.

Embodiments of the invention are described in detail hereafter with reference to the drawings, in which:

FIG. 4 is an axial section through a second embodiment of a cartridge-type control disc mixer valve, similar to FIG. 1;

FIG. 5 is a section on line V—V of FIG. 4;

FIG. 6 is a section on line VI—VI of FIG. 4.

Figure 1:
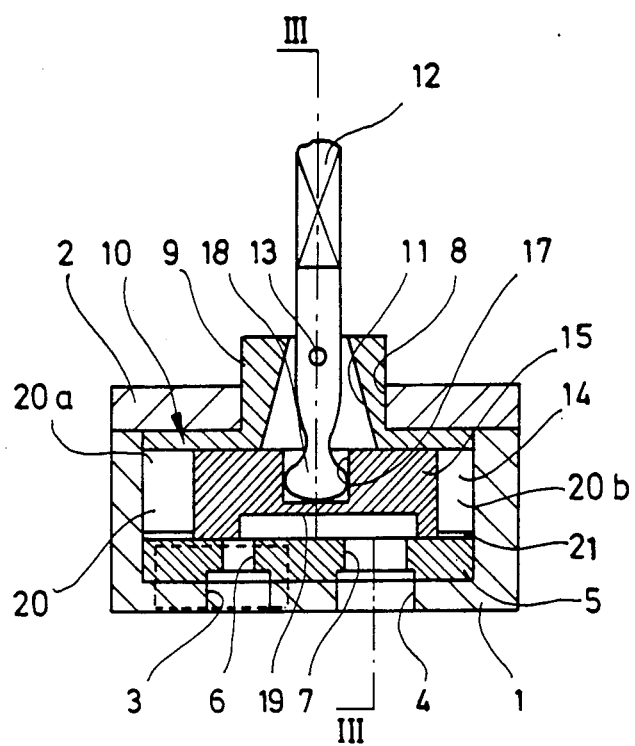
FIG. 1 is an axial section through a cartridge-type control disc mixing valve (in the framed part of the drawing, the section plane is offset parallel to the section plane of the remaining drawing)
Figure 2:
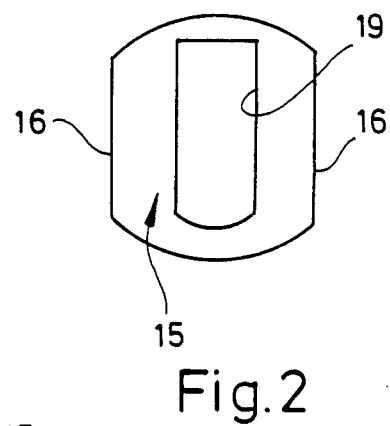
FIG. 2 is an underneath view of the control disc, which is used in the embodiment illustrated in FIG. 1.
Figure 3:
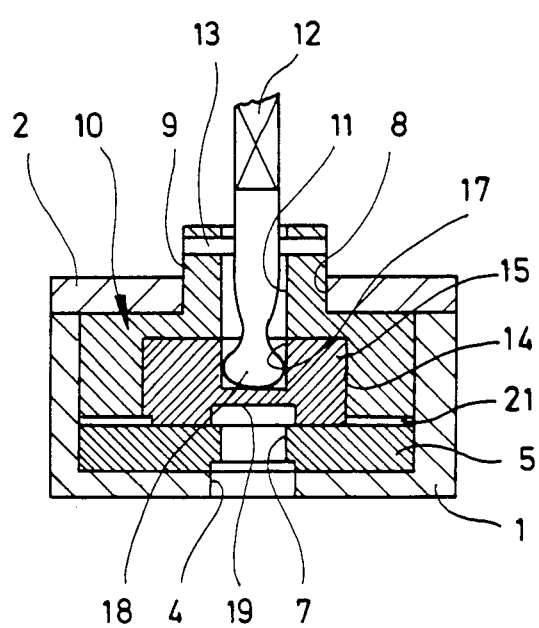
FIG. 3 is a section on line III—III of FIG. 1.

The cartridge-type control disc mixer valve illustrated in FIGS. 1 to 3 includes a cup-shaped lower housing part 1 and a housing cover 2 attached hermetically thereto, for example welded thereto.

Provided in the base of the lower part of the housing 1 are three openings: two inlet openings 3 for cold and hot water as well as an outlet opening 4 for mixed water. The inlet openings 3 do not lie in the section plane of FIG. 1. In order to be able to illustrate at least one of them, in the part of FIG. 1 which is shown in a broken frame, the section was located in a plane which is offset parallel to the section plane of the remainder of the drawing. The geometry and arrangement of these openings is known as such and therefore does not need to be described in detail.

Located on the base of the lower part 1 of the housing is a first control disc 5 consisting of ceramic material, whereof the upwardly directed surface is finely polished or lapped in known manner. It is prevented from turning by appropriate positive engagement in the lower part 1 of the housing and is therefore referred to hereafter as a fixed disc. The fixed disc 5 in turn contained three openings, which communicate with the openings 3, 4 in the lower part 1 of the housing: namely an opening 6 for cold and hot water as well as an opening 7 for returning mixed water.

The gap between the fixed disc 5 and the lower part 1 of the housing is sealed by resilient gaskets known as such and which are not shown. The latter may be inserted for example in grooves in the upwardly pointing bottom surface of the lower part 1 of the housing so that they surround the openings 3 and 4 in the lower part 1 of the housing.

Guided in and axial bore 8 in the housing cover 2 is the cylindrical neck 9 of an entrainment part 10 which is essentially rotationally symmetrical in the outer contour. A central opening 11 which receives an adjusting shaft 12 is guided through the neck 9. The adjusting shaft 12 is pivoted in the upper region of the neck 9 by means of a pivot pin 13. The swinging range of the adjusting shaft 12 is defined by the downwardly diverging walls of the central opening 11 in the neck.

Located in the lower surface of the entrainment part 10 is a relatively wide and deep groove 14, in which a second movable control disc 15 is seated in a positive manner, which hereafter is referred to as the control disc.

As shown in FIG. 2, the control disc 15 has two parallel opposing guide surfaces 16, which cooperate with the side faces of the groove 14 in the entrainment part 10. Located in the polished underside of the control disc 15 is a control recess 19, which by shifting and/or rotation of the control disc 15 can be brought into varying degrees of overlap with the openings 6, 7; due to this it is possible to adjust the quantity and temperature of the emerging mixed water in known manner.

The linear movement of the control disc 15 is brought about directly by swivelling of the adjusting shaft 12, whereof the lower head 18 engages in an entrainment opening 17 on the upwardly pointing surface of the control disc 15. The forces necessary for rotating the control disc 15 are introduced by way of the side faces of the groove 14 in the entrainment part 10, which upon rotation of the adjusting shaft 12 about the vertical valve axis, is rotated therewith.

The upper side of the control disc 15 bears in a tight manner against the bottom face of the groove 14 in the entrainment part 10. On account of the tight connection between the housing cover 2 and the lower part 1 of the housing as well as on account of the aforementioned seals between the upper bottom surface of the lower part 1 of the housing and of the fixed disc 5, a sealed chamber 20 is thus produced within the housing parts 1, 2 and below the entrainment part 10, which includes essentially the volume of the groove 14 of the entrainment part 10 not occupied by the control disc 15 and the gap 21 between the lower side of the entrainment part 10 and the upwardly pointing surface of the fixed disc 5.

The chamber 20 is filled with a viscous, fluid substance. It is divided by the control disc 15 in the manner of a piston into two partial chambers 20a and 20b, which are connected to each other (solely) by way of the gap 21 acting as displacement path. Each linear movement of the control disc 15, which corresponds to a variation in the quantity of the mixed water emerging, thus opposes a braking force, which results from the displacement of the liquid from one partial chamber 20a into the other partial chamber 20b by way of the gap 21. The magnitude of this braking force can be adjusted by the choice of the viscosity and by the cross section of the displacement path as desired within wide limits.

The fluid substance used has constant viscosity within the temperature range between 10° C. and 80° C. Therefore the braking force and thus the shock absorbing action are constant in the normal operating temperature range of the mixer valve. In the simplest case, the fluid substance is water.

However, in the preferred embodiment, one uses as the fluid substance substances which may at the same time bring about lubrication of the sliding surfaces of the two control discs 5, 15. For this reason the latter may primarily be silicone oils and greases or resins, which are available in a very great viscosity range and are physiologically harmless. In the case of suitable dimensions of the displacement path, viscous, pasty masses are also suitable, in particular if additives promoting sliding such as graphite or molybdenum sulphide are added thereto. The lubrication of the sliding surfaces of the two control discs 5, 15 brought about in this way is particularly effective, since at the time of the movements of the control disc 15, a continuous exchange and constant intermixing of the fluid substance used as displacement medium and lubricating medium takes place.

The lower the viscosity of the fluid substance used as compression medium, then the lesser the requirements made of the seal of the chamber 20. In the case of highly viscous liquids, an embodiment which is not shown is used, in which the upper side of the control disc 15 slides along a third disc of ceramic material. In known manner this produces a particularly wear-resistant, dynamic seal.

FIGS. 4 to 6 show a further embodiment of a control disc mixing valve, which corresponds largely to that according to FIGS. 1 to 3. In so far that parts of FIGS.

4 to 6 correspond to those of FIGS. 1 to 3, they are characterised by the same reference numeral, plus 100.

The control disc mixer valve again comprises a lower part 101 of the housing with the openings 103, 104, on which a housing cover 102 is seated in a tight manner.

A fixed disc 105 with the openings 106, 107 is located spatially in the lower part 101 of the housing, on which disc 105 a control disc 115 with a downwardly pointing control recess 119 is able to rotate and slide.

The movements of the control disc 115 are brought about by an adjusting shaft 112, which is mounted in the neck 109 of a part 110 guided in a rotary manner by means of a pivot pin 113 and engages by a cylindrical head 118 in an entrainment opening 117 on the upwardly pointing surface of the control disc 115.

An oval receiving chamber 114 for the control disc 115 is provided from below in the part 110 which is guided in a rotary manner, which slides with its lower end face on the fixed disc 105, which leaves sufficient room for the necessary linear movement of the control disc 115. The latter is in the form of a circular cylinder (see FIG. 5), thus it cannot receive any rotary forces transmitted from the part 110 guided in a rotary manner. The introduction of forces to the control disc 115 takes place exclusively by way of the head 118 of the adjusting shaft 112.

The longitudinal surfaces of the oval receiving chamber 114 form substantially tangential surfaces on the control disc 115. The upwardly pointing surface of the control disc 115 is sealed by an O-ring 122 with respect to the covering surface of the receiving chamber 114.

In the embodiment according to FIGS. 4 to 6, the receiving chamber 114 for the control disc 115 in the part 110 guided in a rotary manner in practice represents a sealed chamber 120, which is divided into two partial chambers 120a and 120b by the control disc 115 in the manner of a piston. These partial chambers 120a and 120b are connected to each other by way of a groove 121 acting as a displacement path in the surface of the cylindrical control disc 15.

The sealed chamber 120 is again filled with a fluid substance, whereof the viscosity is coordinated in such a way with the cross section of the groove 121 in the surface of the control disc 115 that the desired braking force is set at the time of linear movements of the control disc 115. Furthermore the above comments are valid for the embodiment according to FIGS. 1 to 3, in particular also as regards the possible lubricating effect of the fluid substance, in a corresponding manner.

I claim:

1. A control disc valve arrangement comprising in combination
   (a) a housing,
   (b) a stationary control disc fixedly positioned within said housing and being in the form of a flat planar member having inlet ports located therein for the introduction of fluids from outside said housing, and at least one outlet port located therein which is adapted for the exit of fluids introduced through said inlet ports,
   (c) a movable control disc movably positioned within said housing and being in the form of a flat planar member having one surface adapted to slide back and forth relative to one flat surface of said stationary control disc,
   (d) a passageway in said movable control disc that is capable of controlling the flow of fluid between said inlet ports and said outlet port depending upon the position of said movable control disc with respect to said stationary control disc,
   (e) a closed chamber surrounding the perimeter of said movable control disc in such a manner that the movable control disc separates said closed chamber into two spaced apart smaller chambers in the manner of a piston,
   (f) a displacement path connecting said two smaller chambers, the cross-sectional area of said path being small in comparison to the cross-sectional area of either of said smaller chambers,
   (g) a fluid substance filling the space in said closed chamber that is not occupied by said movable control disc, and
   (h) means for moving said movable control disc from one position to another to thereby control the flow of fluid from said inlet ports to said outlet port whereby the movement of said movable control disc changes the relative volumes of said two spaced apart smaller chambers and such movement is slowed while said fluid substance in said closed chamber is forced from one smaller chamber to the other smaller chamber through said displacement path by virtue of the piston-like action of said movable control disc.

2. An arrangement according to claim 1 wherein said closed chamber (20; 120) is bounded on its underside by said stationary control disc.

3. An arrangement according to claim 1 wherein said closed chamber is bounded on its upper side by a third disc, along which the upwardly pointing surface of the movable control disc slides.

4. An arrangement according to claim 1 wherein said closed chamber (20) is bounded on its sides by the walls of said housing.

5. An arrangement according to claim 1 wherein said movable control disc is mounted for combined rotary and linear movement.

6. An arrangement according to claim 1 wherein said means for moving said movable control disc comprises a shaft that extends through said housing by means of a rotary guide and has a head portion on its lower end that engages the portion of the movable control disc that is removed from said stationary disc.

7. An arrangement according to claim 1 wherein said closed chamber surrounding said movable control disc is mounted within said housing so that it can be rotated within said housing by movement of said moving means (h).

8. An arrangement according to claim 7 wherein said rotatable closed chamber has one surface which rotatably slides over a portion of the flat upper surface of said stationary control disc.

9. An arrangement according to claim 1 wherein said displacement path comprises a groove in the surface of said movable control disc.

10. An arrangement according to claim 1 wherein said displacement path comprises a groove on the interior of said closed chamber.

11. An arrangement according to claim 1 wherein the fluid substance has substantially constant viscosity in the range between 10° C. and 80° C.

12. An arrangement according to claim 1 wherein said fluid substance is water.

13. An arrangement according to claim 1 wherein said fluid has a lubricating property for the control discs.

14. An arrangement according to claim 1 wherein said fluid substance is a silicone oil or grease.

15. An arrangement according to claim 1 wherein said fluid substance is a viscous or pasty mass with added sliding additives.

* * * * *